(12) United States Patent
Sayed et al.

(10) Patent No.: US 12,512,120 B2
(45) Date of Patent: Dec. 30, 2025

(54) SPIN-ORBIT TORQUE ASSISTED MAGNETIC WRITE HEAD STRUCTURE FOR PERPENDICULAR MAGNETIC RECORDING

(71) Applicant: Headway Technologies, Inc., Milpitas, CA (US)

(72) Inventors: Shehrin Sayed, Fremont, CA (US); Haowen Ren, Fremont, CA (US); Yue Liu, Fremont, CA (US); Wenyu Chen, San Jose, CA (US); Yuhui Tang, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 87 days.

(21) Appl. No.: 18/375,136

(22) Filed: Sep. 29, 2023

(65) Prior Publication Data
US 2025/0111863 A1   Apr. 3, 2025

(51) Int. Cl.
| | | |
|---|---|---|
| *G11B 5/23* | (2006.01) | |
| *G11B 5/127* | (2006.01) | |
| *G11B 5/235* | (2006.01) | |
| *G11B 5/31* | (2006.01) | |
| *G11B 5/00* | (2006.01) | |

(52) U.S. Cl.
CPC ............. *G11B 5/1278* (2013.01); *G11B 5/23* (2013.01); *G11B 5/235* (2013.01); *G11B 5/3133* (2013.01); *G11B 5/314* (2013.01); *G11B 5/315* (2013.01); *G11B 2005/0024* (2013.01)

(58) Field of Classification Search
None
See application file for complete search history.

(56) References Cited

U.S. PATENT DOCUMENTS

| | | | |
|---|---|---|---|
| 9,390,731 B2* | 7/2016 | Koui | G11B 5/314 |
| 10,181,334 B1 | 1/2019 | Song et al. | |
| 10,497,416 B2 | 12/2019 | Sayed et al. | |
| 10,559,318 B1 | 2/2020 | Chen et al. | |
| 10,580,441 B1 | 3/2020 | Chen et al. | |
| 10,679,650 B2* | 6/2020 | Bai et al. | G11B 5/23 |
| 10,714,127 B1* | 7/2020 | Chen et al. | G11B 5/3133 |

(Continued)

FOREIGN PATENT DOCUMENTS

WO   2022/094107 A1   5/2022

OTHER PUBLICATIONS

DC, M. et al., "Room-Temperature High Spin-Orbit Torque Due to Quantum Confinement in Sputtered BixSe(1-X) Films", Nature Materials, vol. 17, pp. 800-807, Sep. 2018.

(Continued)

*Primary Examiner* — Craig A. Renner
(74) *Attorney, Agent, or Firm* — DLA Piper LLP (US)

(57) ABSTRACT

The present embodiments relate to a PMR write-head structure where the spin-orbit torque (SOT) material is in contact with the main pole in the write gap (WG). In addition, with the write shield (WS) electrically isolated from the side shield (SS) in the present designs, the current can be confined in the SOT material near the main pole, and the device resistance can remain within a reasonable range. It can be shown, using simulations, that the main pole switching rise time can be improved by 18~24% using spin-orbit torque from heavy metals like platinum.

18 Claims, 12 Drawing Sheets

(56) References Cited

U.S. PATENT DOCUMENTS

| | | | |
|---|---|---|---|
| 10,714,136 B1 | 7/2020 | Chen et al. | |
| 10,748,562 B1 | 8/2020 | Chen | |
| 10,770,104 B1 | 9/2020 | Chen et al. | |
| 10,811,034 B1* | 10/2020 | Wu et al. | G11B 5/3929 |
| 10,839,844 B1* | 11/2020 | Asif Bashir et al. | G11B 5/1278 |
| 11,017,806 B2 | 5/2021 | Chen et al. | |
| 11,056,136 B2 | 7/2021 | Chen | |
| 11,152,021 B1 | 10/2021 | Liu et al. | |
| 11,295,768 B1* | 4/2022 | Liu et al. | G11B 5/235 |
| 11,417,834 B2 | 8/2022 | Sayed et al. | |
| 11,557,314 B1* | 1/2023 | Asif Bashir et al. | G11B 5/235 |
| 11,875,825 B1 | 1/2024 | Liu | |

OTHER PUBLICATIONS

Garello, K. et al., "Spin-Orbit Torque MRAM for Ultrafast Embedded Memories: From Fundamentals to Large Scale Technology Integration", 2019 IEEE 11th International Memory Workshop (IMW), 4 pages, 2019.

Han, X. et al., "Spin-Orbit Torques: Materials, Physics, and Devices", Applied Physics Letters, vol. 118, No. 12, 120502, Mar. 2021.

Liu, L. et al., "Spin-Torque Switching with the Giant Spin Hall Effect of Tantalum", Science, vol. 336, pp. 555-558, May 2012.

Manipatruni, S. et al., "Scalable Energy-Efficient Magnetoelectric Spin-Orbit Logic", Nature, vol. 565, pp. 35-42, Jan. 2019.

Mellnik, A.R. et al., "Spin-Transfer Torque Generated by a Topological Insulator", Nature, vol. 511, No. 7510, pp. 449-451, Jul. 2014.

Miron, I.M. et al., "Perpendicular Switching of a Single Ferromagnetic Layer Induced by In-Plane Current Injection", Nature, vol. 476, pp. 189-193, Aug. 2011.

Niimi, Y. et al., "Extrinsic Spin Hall Effects Measured with Lateral Spin Valve Structures", Physical Review B, vol. 89, No. 5, 054401, Feb. 2014.

Reinsel, D. et al., "Data Age 2025, The Digitization of the World—From Edge to Core", IDC White Paper, #US44413318, Nov. 2018.

Ren, H. et al., "Hybrid Spin Hall Nano-Oscillators Based on Ferromagnetic Metal/Ferrimagnetic Insulator Heterostructures", Nature Communications, vol. 14, pp. 1-7, Mar. 2023.

Ren, H. et al., "Ion Beam Etching Dependence of Spin-Orbit Torque Memory Devices with Switching Current Densities Reduced by Hf Interlayers", APL Materials, vol. 9, No. 9, 091101, Sep. 2021.

Sayed, S. et al., "Proposal of a Single Nano-Magnet Memory Device", IEEE Electron Device Letters, vol. 38, No. 12, pp. 1665-1668, Dec. 2017.

Sayed, S. et al., "Spin-Orbit Torque Rectifier for Weak RF Energy Harvesting", Applied Physics Letters, vol. 118, 052408, Feb. 2021.

Sayed, S. et al., "Unified Framework for Charge-Spin Interconversion in Spin-Orbit Materials", Physical Review Applied, vol. 15, No. 5, 054004, May 2021.

Shao, Q. et al., "Roadmap of Spin-Orbit Torques", IEEE Transactions on Magnetics, vol. 57, No. 7, Jul. 2021.

Suzuki, T. et al., "Current-Induced Effective Field in Perpendicularly Magnetized Ta/CoFeB/MgO Wire", Applied Physics Letter, vol. 98, No. 14, 142505, Apr. 2011.

Yang, H. et al., "Giant Charge-to-Spin Conversion Efficiency in SrTiO3-Based Electron Gas Interface", Physical Review Applied, vol. 12, No. 3, 034004, Sep. 2019.

Zhu, J. et al., "Microwave Assisted Magnetic Recording", IEEE Transactions on Magnetics, vol. 44, No. 1, pp. 125-131, Jan. 2008.

* cited by examiner

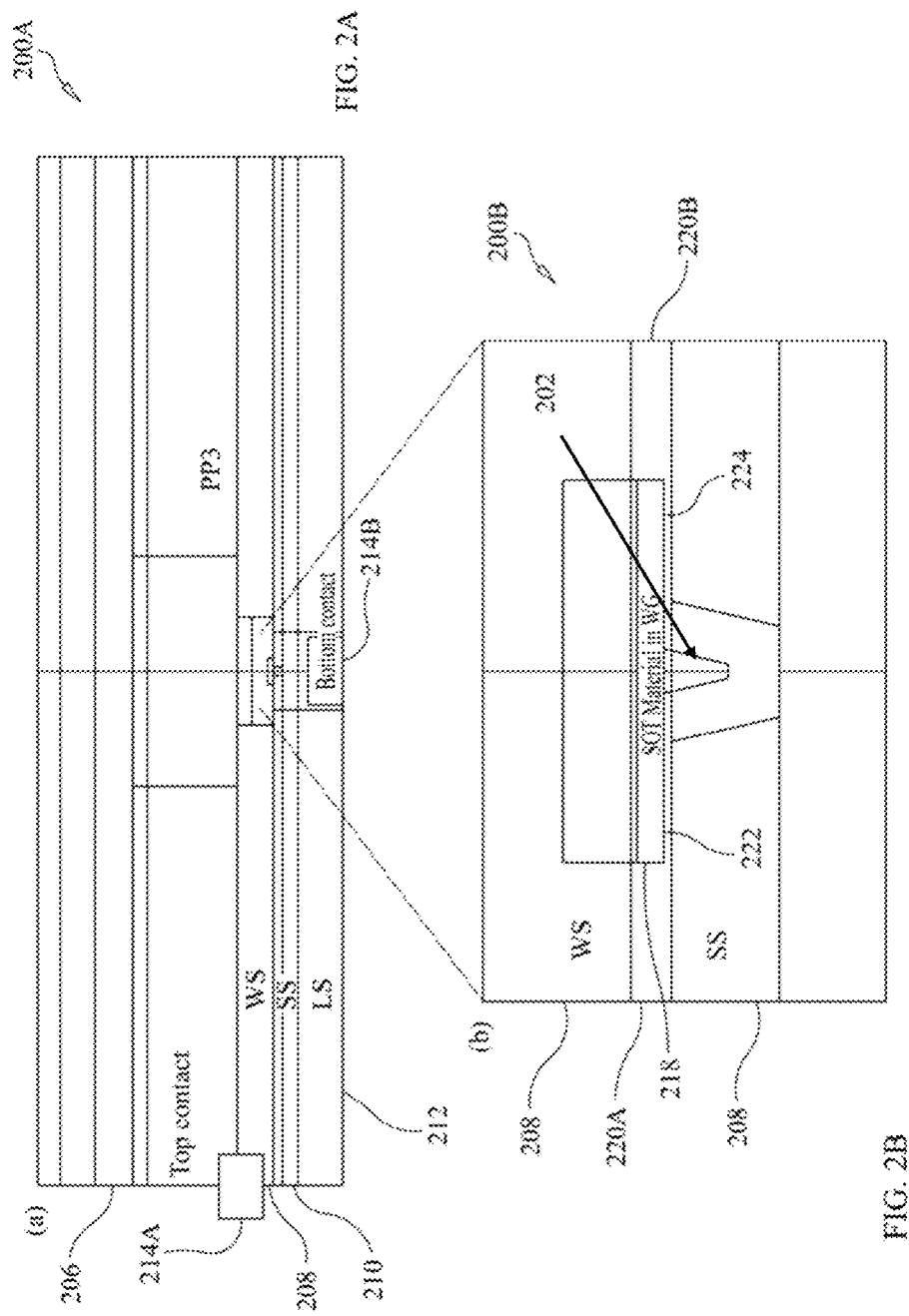

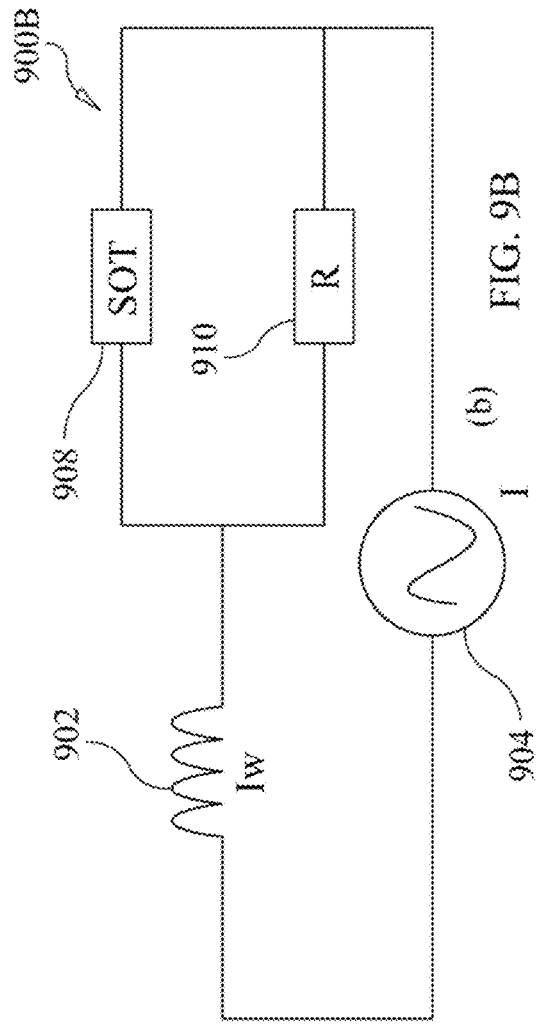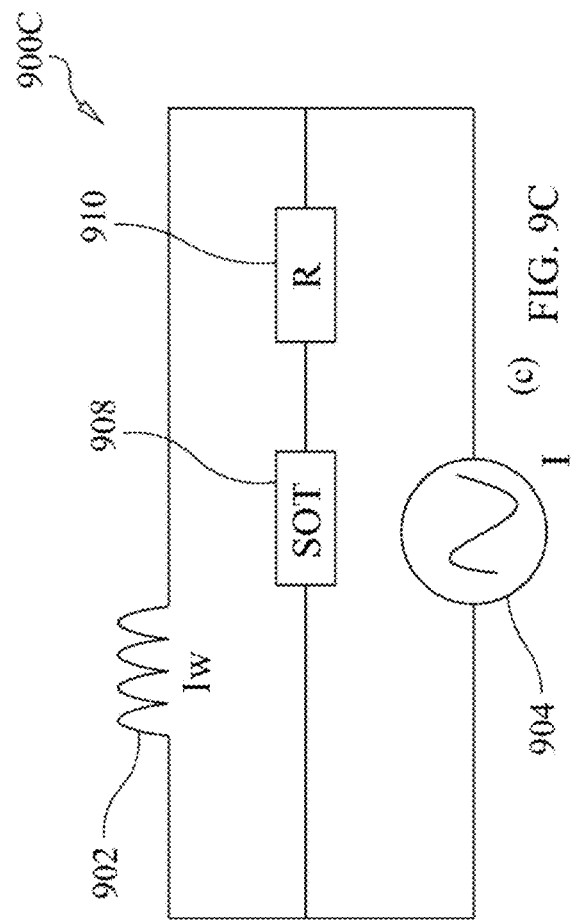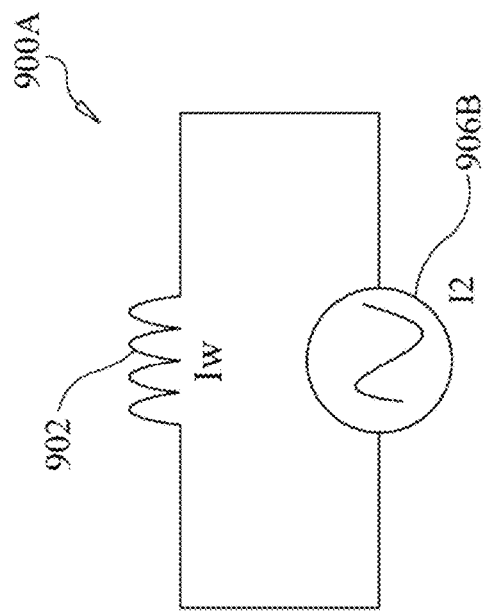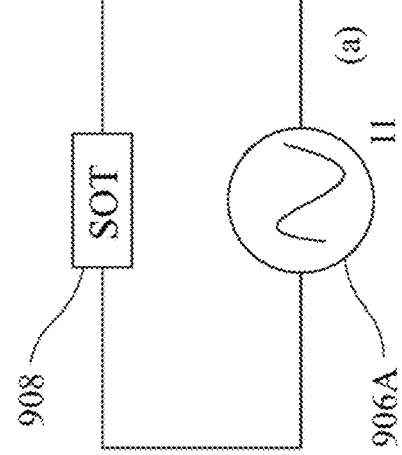
FIG. 9A
FIG. 9B
FIG. 9C

SPIN-ORBIT TORQUE ASSISTED MAGNETIC WRITE HEAD STRUCTURE FOR PERPENDICULAR MAGNETIC RECORDING

TECHNICAL FIELD

Embodiments of the invention relate to the field of electro-mechanical data storage devices. More particularly, embodiments of the invention relate to a write head for a disk drive with a spin-orbit torque assisted magnetic write head structure.

BACKGROUND

A magnetic recording medium (e.g., a magnetic disk) can store magnetic bits representing digital data. A magneto-resistive writer can be part of a hard disk drive (HDD) to write digital data to the magnetic recording medium.

As an overall amount of digital data being stored on HDD devices increases, there is an increasing demand for increased data capacity of HDD devices. One technique to increase data capacity for an HDD can include heat-assisted magnetic recording (HAMR). HAMR techniques increase the density of HDDs by applying heat to a portion of the magnetic recording medium, which can enhance write performance of the write head to the magnetic recording medium.

SUMMARY

The present embodiments relate to a PMR write-head structure where the SOT material is in contact with the main pole in the write gap (WG). In addition, with the write shield (WS) electrically isolated from the side shield (SS) in the present designs, the current can be confined in the SOT material near the main pole, and the device resistance can remain within a reasonable range. It can be shown, using simulations, that the main pole switching rise time can be improved by 18~24% using spin-orbit torque from heavy metals like platinum.

In a first example embodiment, a write head for a disk drive is provided. The write head can include a main pole (MP) configured to provide a magnetic flux to a recording medium, a trailing shield (TS), and a write gap (WG) between the MP and TS. The WG can include an electrical conducting material that is capable of inducing a current-induced spin-orbit torque (SOT).

The write head can also include a write shield (WS) configured to mitigate magnetic flux from reaching the bits on the media. The WG comprising the material capable of inducing the SOT can extend along at least a portion of a length of the WS.

The write head can also include a coil wrapped around the MP through a PP3 shield to provide a current to saturate the magnetic flux at the MP.

In some instances, the WG comprising the material capable of inducing the SOT extends along the length of the WS. Each of a first end and a second end of the WG can include a dielectric oxide layer to electrically isolate the WS from a side shield (SS).

In some instances, the write head further comprises a first oxide layer disposed between the SS and the WG comprising the material capable of inducing the SOT. The first oxide layer can extend between a first side of the WG and a first side of the MP.

In some instances, the write head further comprises a second oxide layer disposed between the SS and the WG comprising the material capable of inducing the SOT and extending between a second side of the WG and a first side of the MP.

In some instances, an opening for electrical conduction is formed in the WG in the material capable of inducing the SOT. A bias current can be configured to flow in the WG through the opening.

In some instances, a height of the WG is about the same as a height of the SS to minimize a resistance of the write head below 10 ohms and increase maximum bias current to 8 milliamps (mA). The height of the WG matching the height of the SS can increase a contact area between the material capable of inducing the SOT and the MP, that enhances the effect of SOT.

In some instances, the write head further comprises a first contact and a second contact disposed between the WS and SS. The bias current can be applied between the first contact and second contact for the bias current to enter the WG comprising the material capable of inducing the SOT and is concentrated near the opening to ensure that a percentage of the bias current is concentrated near the material capable of inducing the SOT.

In some instances, the first contact is disposed at any position along the WS, and wherein the second contact is disposed on the SS.

In some instances, a direction of the bias current is synchronized to a current flow direction of the coil such that a spin polarization in the material configured to induce the SOT is in the same direction as the current flow direction of the coil.

In some instances, the bias current direction is synchronized to the current flow direction by driving each of the bias current and the current flow separately with independent current sources.

In some instances, the bias current direction is synchronized to the current flow direction by configuring the material capable of inducing the SOT and the coil in series or parallel. A resistor can be disposed in the other of series or parallel to the WG comprising the material capable of inducing the SOT.

In another example embodiment, a device is provided. The device can include a main pole (MP), a trailing shield (TS), and a write gap (WG) between the MP and TS. The WG can comprise an electrical conducting material that is capable of inducing a current-induced spin-orbit torque (SOT).

The device can also include a write shield (WS), where the WG comprising the material capable of inducing the SOT extends along at least a portion of a length of the WS. The device can also include a side shield (SS), where each of a first end and a second end of the WG comprises a dielectric oxide layer to electrically isolate the WS from the SS. The device can also include a side gap (SG) between the MP and SS on one or more sides of the MP tip and a coil wrapped around the MP through a PP3 shield to provide a current flow to saturate the magnetic flux at the MP.

In some instances, the device can include a first oxide layer disposed between the SS and the WG comprising the material capable of inducing the SOT. The first oxide layer can extend between a first side of the WG and a first side of the MP.

In some instances, the device can include a second oxide layer disposed between the SS and the WG comprising the material capable of inducing the SOT and extending between a second side of the WG and a second side of the MP.

In some instances, an opening is formed in the WG in the material capable of inducing the SOT, wherein a bias current is configured to flow in the WG through the opening.

In some instances, the device can include a first contact and a second contact disposed on the WS and SS, respectively, where the bias current is applied between the first contact and second contact for the bias current to enter the WG comprising the material capable of inducing the SOT and is concentrated near the opening to ensure that a percentage of the bias current is concentrated near the material capable of inducing the SOT.

In some instances, a direction of the bias current is synchronized to a current flow direction of the coil such that a spin polarization in the material configured to induce the SOT is in the same direction as the current flow direction of the coil. The bias current direction can be synchronized to the current flow direction by driving each of the bias current and the current flow separately with independent current sources or by configuring the material capable of inducing the SOT and the coil in series or parallel with a resistor disposed in the other of series or parallel to the WG comprising the material capable of inducing the SOT.

In another example embodiment, a write head is provided. The write head can include a main pole (MP), a trailing shield (TS), and a write gap (WG) between the MP and TS. The WG can include an electrical conducting material that is capable of inducing a current-induced spin-orbit torque (SOT). Further, an opening for electrical conduction can be formed in the WG in the material capable of inducing the SOT. A bias current can be configured to flow in the WG through the opening. The write head can also include a write shield (WS) configured to mitigate magnetic flux from reaching the bits on the magnetic media. The WG comprising the material capable of inducing the SOT can extend along at least a portion of a length of the WS. The write head can also include a coil wrapped around the MP through a PP3 shield to provide a current to saturate the magnetic flux at the MP.

In some instances, the material capable of inducing the SOT comprises any of platinum, tantalum, tungsten, iridium, copper-iridium alloy, copper-bismuth ally, and an iridium-manganese alloy.

In some instances, a direction of the bias current is synchronized to a current flow direction of the coil such that a spin polarization in the material configured to induce the SOT is in the same direction as the net magnetic moment induced in the MP by the current flow direction of the coil. The bias current direction can be synchronized to the current flow direction by driving each of the bias current and the current flow separately with independent current sources or by configuring the material capable of inducing the SOT and the coil in series or parallel with a resistor disposed in the other of series or parallel to the WG comprising the material capable of inducing the SOT.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which:

FIGS. 2A-C illustrate views of the SOT write head structure with top contact for bias application connected to the WS and bottom contact for bias application connected to the SS according to an embodiment.

FIG. 9A-9C illustrates example circuits to drive both the write coil current and the SOT bias current synchronously according to an embodiment.

DETAILED DESCRIPTION

Figure 1:
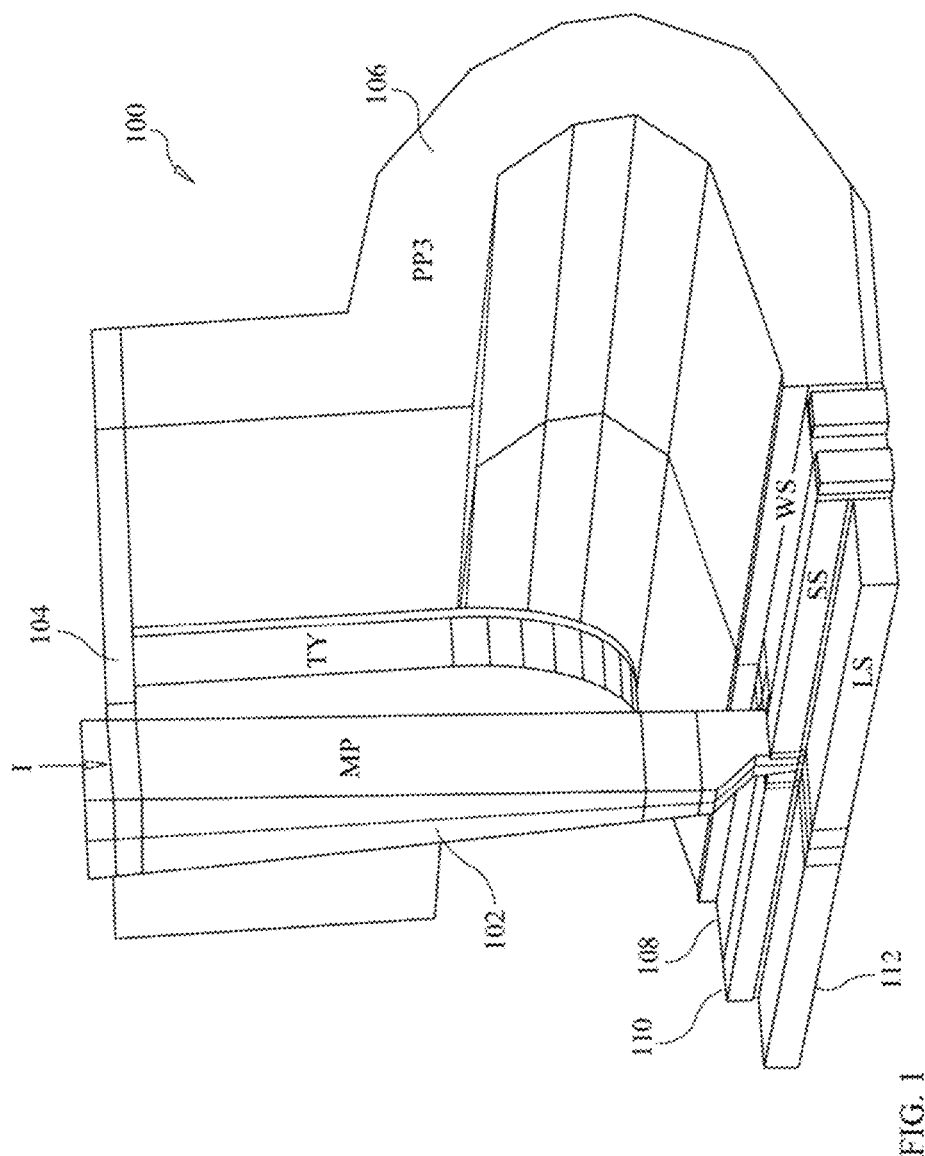
FIG. 1 illustrates a write head comprising a Non-Dual-Write-Shield (nDWS) structure according to an embodiment.

A disk drive can include a write head to interact with a magnetic recording medium to read and write digital data to the magnetic recording medium. As the amount of digital data is required to be stored increases and with an increase in data aerial density of hard disk drive (HDD) writing, both the write head and digital data written to the magnetic recording medium can be made smaller.

The HDD industry has been a crucial part in the digital revolution, providing a storage technology for personal computers, servers, and data centers for several decades. With the exponential growth in data generation worldwide, the HDD industry can be used to address the massive demand for data storage. The growth rate of data generation from the world has been exponential in recent years, driven by the widespread use of digital devices, the internet, and cloud computing. According to recent studies, the amount of data generated worldwide is expected to reach 180 zettabytes (ZB) by 2025, up from 33 ZB in 2018.

Such a growth can largely depend on the shrinking media bits and the shrinking write head structures to match the smaller grains. The former can be achieved by larger coercive fields of media grains in perpendicular magnetic recording (PMR). However, the limitations in scaling can arise due to the degraded performance in shrinking write heads operating at the GHz frequency.

Therefore, there is a growing interest in improving the write head performance in HDD with an assist from heat and microwave sources, which instigated the development of heat-assisted magnetic recording (HAMR) and microwave-assisted magnetic recording (MAMR) technologies. Both the HAMR and MAMR technologies can apply energy to the media from an external source to make it temporarily softer so that the degraded writability in the existing write heads is sufficient. To recover the degradation of many PMR write heads, assistive technologies can be developed, which can run a current through the main pole of the write head to minimize unwanted domain formation. Such an effort led to many branches of various PMR writing head designs. All of these current-assisted designs can achieve improvements due to magnetization rotation from the current-induced-Oersted-field distribution.

There is a growing interest in a phenomenon called the current-induced spin-orbit torque (SOT) that can have a much stronger impact on the magnetization dynamics than an Oersted field and has been demonstrated using various materials exhibiting spin-orbit coupling or Rashba interfaces or topological surface states. Such a physics for magnetization switching has led to many new applications, including, but not limited to, binary logic processing, random access memory, energy harvesting, nano-oscillators, and RF detection. The utilization of SOT in PMR to improve the main pole dynamics has been discussed by adding SOT materials in contact with the main pole either in the write gap of the head or in both write and side gaps around the main pole.

However, many PMR write-head structures consist of various shields made of highly conducting magnetic materials, which can shunt most of the bias current. Thus, only a small fraction of the bias current may flow into the SOT material, which can be insufficient to apply a strong SOT on the main pole. Such considerations may not be discussed in many designs. In some instances, the bias current can be confined in the SOT material using electrical isolations; however, such effort can increase the device resistance substantially and may not be desirable in magnetic recording technologies.

The present embodiments relate to a PMR write-head structure where the SOT material is in contact with the main pole in the write gap (WG). In addition, with the write shield (WS) electrically isolated from the side shield (SS) in the present designs, the current can be confined in the SOT material near the main pole, and the device resistance can remain within a reasonable range. It can be shown, using simulations, that the main pole switching rise time can be improved by 18~24% using spin-orbit torque from heavy metals like platinum.

SOT Write Head Structure and Design

The structures as described herein can be similar to a baseline non-dual-write-shield (nDWS)-based write head structure (see FIG. 1) comprised of a main pole that provides a strong and concentrated magnetic flux to write the medium bit, a trailing shield consisting of a hot seed (HS) that collects back the magnetic flux, and a WG between the main pole and the trailing shield. The structure also can include a SS, a leading shield (LS), and a WS that prevents magnetic flux from reaching the medium bits away from the main pole tip. There can also include a side gap (SG) between the main pole and the side shield on both sides of the main pole tip. A leading gap (LG) can exist between the main pole and the leading shield. All gap materials can be non-magnetic materials. The SG and LG material in the disclosed structure can be an electrical insulator like $Al_2O_3$. A coil wrapping around the main pole through a PP3 shield can take a time-dependent write current to saturate the main pole magnetization.

FIG. 1 illustrates a write head 100 comprising a Non-Dual-Write-Shield (nDWS) structure with a main pole (MP) 102, leading shield (LS) 112, side shield (SS) 110, write shield (WS) 108, top yolk (TY) 104, and return pole (PP3) 106. TY 104 and PP3 106 can be electrically isolated using a thin insulator.

The WG material in the disclosed structure can include a SOT material that is highly conductive and exhibits a high SOT efficiency. The choice of material can include but is not limited to, platinum (Pt), tantalum (Ta), tungsten (W), iridium (Ir), copper-iridium (CuIr) alloy, copper-bismuth (CuBi) alloy, and IrMn. The SOT material can only fill the WG or extend in both directions as needed; see FIGS. 2A-B. Starting from the two ends of the SOT material layer, oxide layers on both sides completely electrically isolate WS from the SS, see FIGS. 2A-B.

Figure 2C:
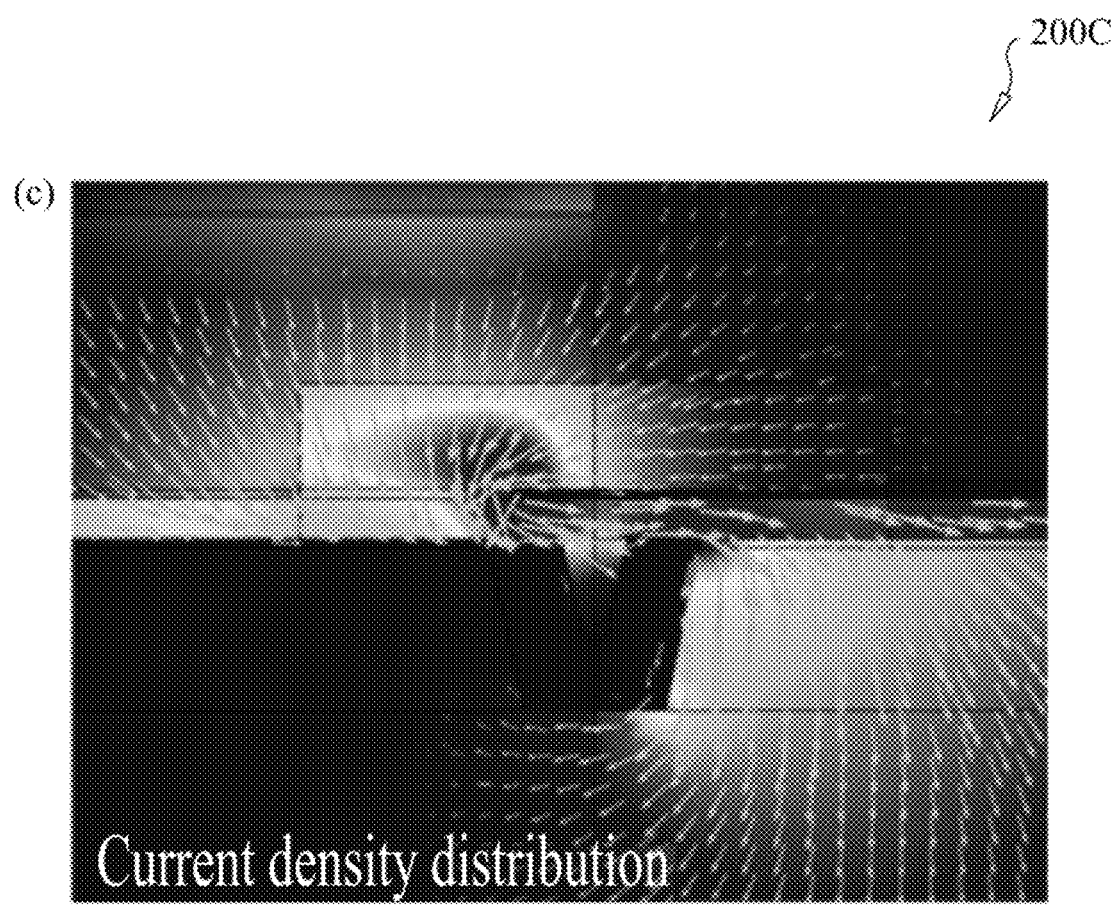

FIG. 2A illustrates an ABS view of the SOT write head structure 200A with top contact for bias application connected to the WS and bottom contact for bias application connected to the SS. FIG. 2B illustrates a zoomed version of the ABS view 200B near the main pole tip. FIG. 2C illustrates a bias current density distribution in the SOT write head structure 200C.

As shown in FIG. 2A, the structure 200A can include a PP3 206, WS 208, SS 210, and LS 212 and contacts 214A-B. Further, in FIG. 2B, the structure 200B can include a MP 202, WS 208, SS 208, and a SOT material in the WG 218. Further, oxide layers 220A-B can be disposed adjacent to the SOT material 218, and thin oxide layers 222, 224 can be disposed between the MP 202 and the SOT material 218.

On the left side of the main pole tip, there can include a thin oxide layer 222 that electrically isolates the SOT material from the SS. This thin oxide can start from the left end of the SOT material and ends near the left edge of the main pole tip, see FIG. 2B. On the right side of the main pole tip, another thin oxide layer 224 electrically isolates the SOT material from the WS and the HS. This second thin oxide 224 can start from the right end of the SOT material and ends near the left edge of the main pole tip, see FIG. 2B. The isolation configuration using thin oxides can create a small opening in the SOT material near the main pole tip.

In some instances, the configuration of the thin oxides can be interchanged, i.e., the thin oxide that isolates SOT material from the SS can start from the right end of the SOT material and end on the right edge of the main pole tip. Similarly, the thin oxide that isolates SOT material from the WS/HS can start from the left end of the SOT material and end on the right edge of the main pole tip.

To inject bias current through the SOT material in the WG, two contacts (top contact and bottom contact) can be electrically connected to the WS and SS, respectively. When a bias current is injected in the top contact and extracted out of the bottom contact, or vice versa, the bias current enters from the SOT material through the small opening for electrical conduction created by the thin oxides near the main pole, see FIG. 2C. The current can enter the left region of the SOT material from the WS and gets concentrated near the small opening near the main pole. Finally, the current can exist and spread out on the SS from the right side of the SOT material. According to the finite-element-method-based simulations, >95% of the bias current can flow horizontally through the SOT material in the WG, and <5% of the bias current may get shunted in the main pole.

The present designs can achieve a low device resistance between the top and the bottom contacts. The current flow path can be a series connection of three parts in the write head structure: (1) the portion of the WS between the top contact and SOT material, (2) the SOT material in the thin oxide opening near the main pole tip (218), and (3) the portion of the SS between the SOT material and the bottom contact (208).

The first item mentioned above may have a minimal effect on the device resistance because conventional WS generally may have a low resistive material and can add ~1Ω depending on the position of the top contact. Thus, the top contact can be placed on any position on the WS without significantly changing the head performance. In a case where the WS comprises a highly resistive material, the top contact disposed on WS can be as close as possible to the main pole tip. The device resistance can be constrained mainly by the nature of the thin oxide opening in the SOT material (item 2 mentioned above), which can contribute approximately 5~8Ω, assuming the point-of-reference (POR) structure and materials and Pt as the SOT material. A third item mentioned above can increase the device resistance significantly because the SS material is generally highly resistive. Thus, putting the bottom contact on SS as close as possible near the main pole tip is necessary. Thus, with POR structure and materials, the device resistance can be <10Ω if the bottom contact on the SS can be near the main pole center and the SOT material height is the same as the SS height.

Figure 3A:
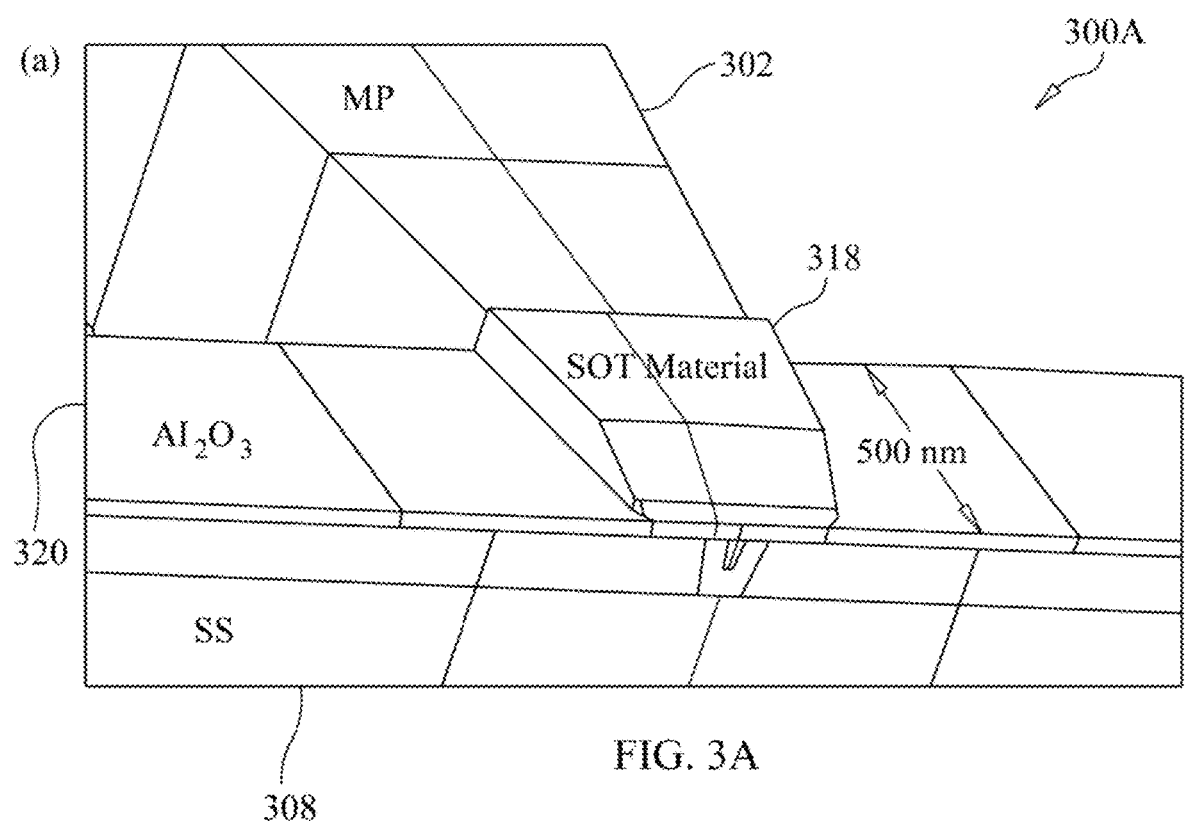
FIGS. 3A-D illustrate views of a shape of the SOT material in the SOT write head structure (into the ABS plane) according to an embodiment.
Figure 3B:
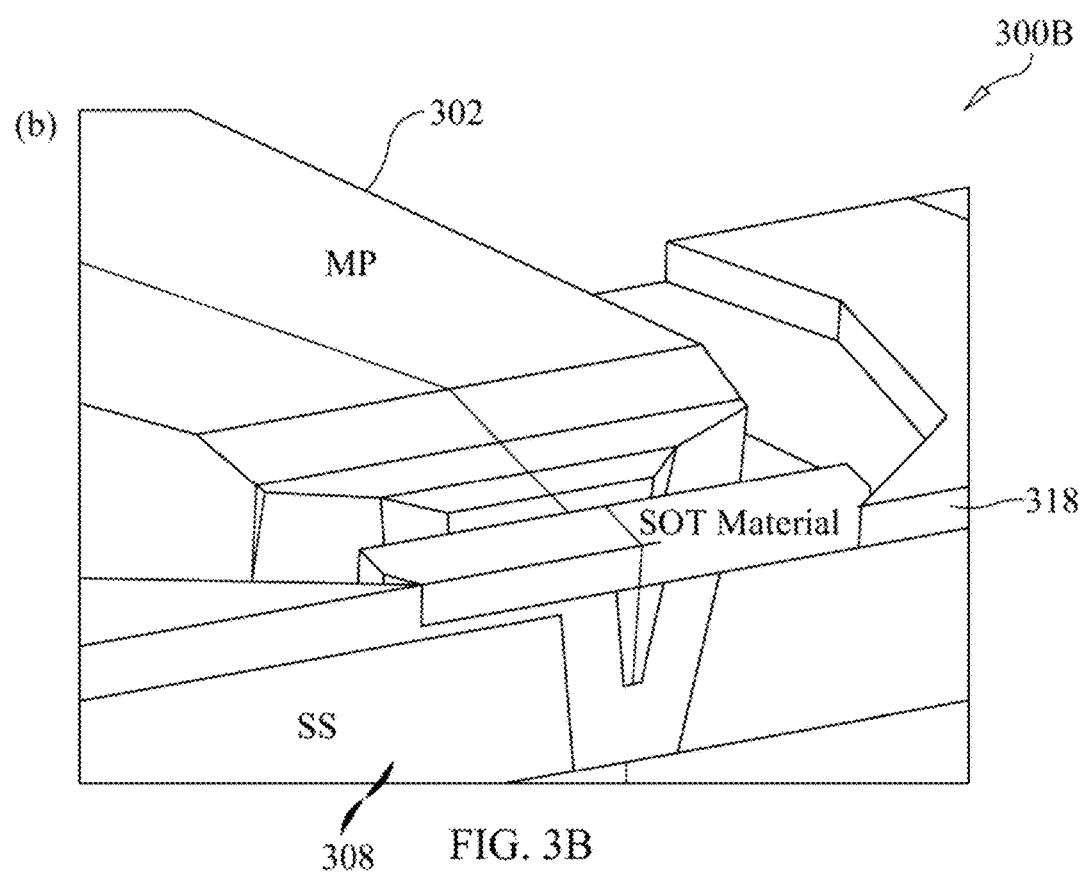
Figure 3C:
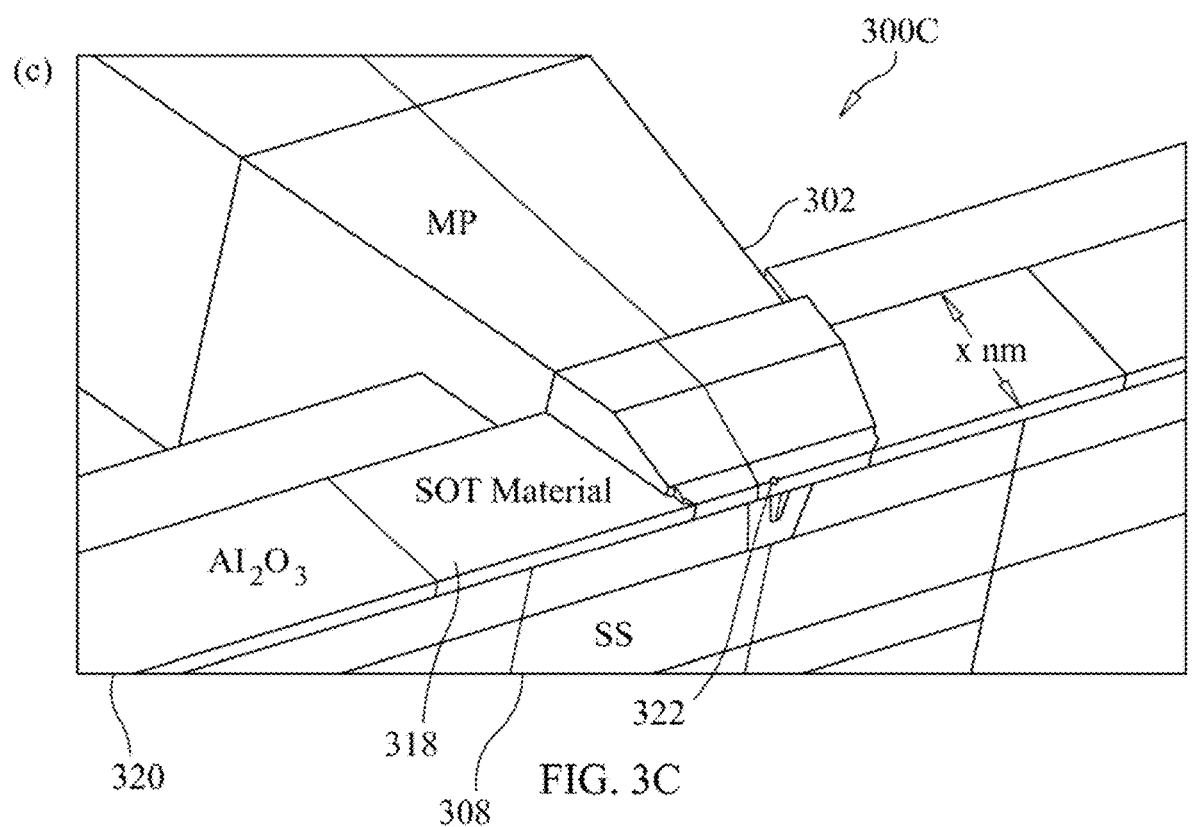
Figure 3D:
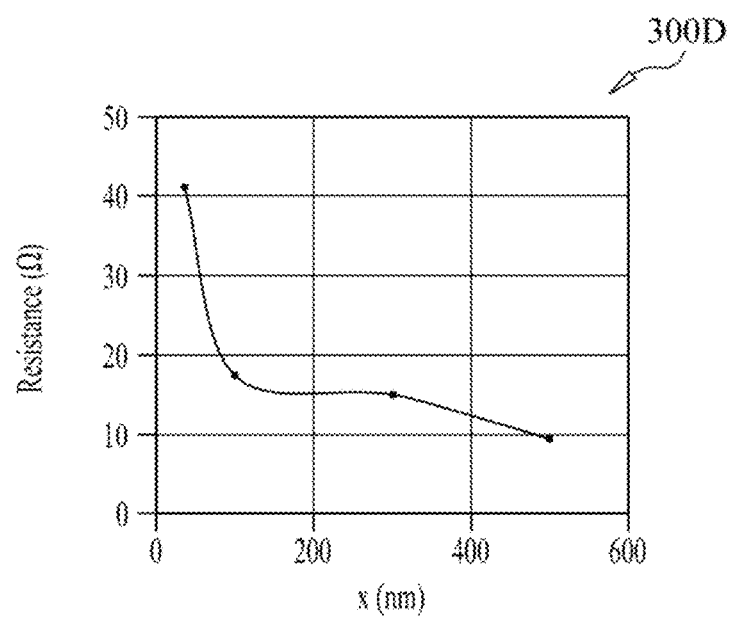

FIGS. 3A-D illustrate views 300A-D of a shape of the SOT material in the SOT write head structure (into the ABS plane). FIG. 3A illustrates a maximum SOT material height can be up to the height of the SS, which is about 500 nm in the POR structure. FIG. 3B illustrates that the SOT material height is only up to the eTHd height of the hot seed. FIG. 3C illustrates that the SOT material height can be any value from the eTHd height up to the SS height. FIG. 3D illustrates a corresponding device resistance as a function of the SOT material height. For example, the structures can include a MP 302, SS 308, SOT material 318, and/or an aluminum oxide dielectric 320. Further, the SOT material 318 can have an opening 322 formed therein as described below.

The SOT material height can also play a role in determining the resistance of the write head. The lowest resistance can be achieved when the SOT material height is the same as the SS height, as shown in FIG. 3A. For the POR structure, the SS height is ~ 500 nm, and the device resistance is <10Ω (see FIG. 3D), provided that the bottom contact is close to the main pole. The minimum SOT material height can be the eTHd height of the write head, as shown in FIG. 3B. However, the POR structure and material can yield as much as 40Ω device resistance for a shorter-height SOT material (see FIG. 3D). For different designs, the SOT material height can be of any value between the eTHd height and the SS height, as shown in FIG. 3C. For example, in the POR structure and material, the device resistance can be between 15Ω and 17Ω for the SOT material height between 300 nm and 100 nm, respectively (see FIG. 3D).

The device resistance and the path resistance can play a role in the Joule heating-induced temperature rise in the device. The reliability of the device can be limited to the maximum temperature rise of 30° C. in the structure, which can correspond to the maximum allowable bias current of 8 mA and about 33% higher than the allowable current in other PMR write head structures that use current-induced Oersted field distribution for an assist. The maximum allowable bias current for the SOT material height between 100 nm and 300 nm is between 6.6 and 7.4 mA, according to the finite-element-method-based simulations. The maximum allowable bias current for the lowest SOT material height (eTHd height) can be about 3 mA.

Figure 4:
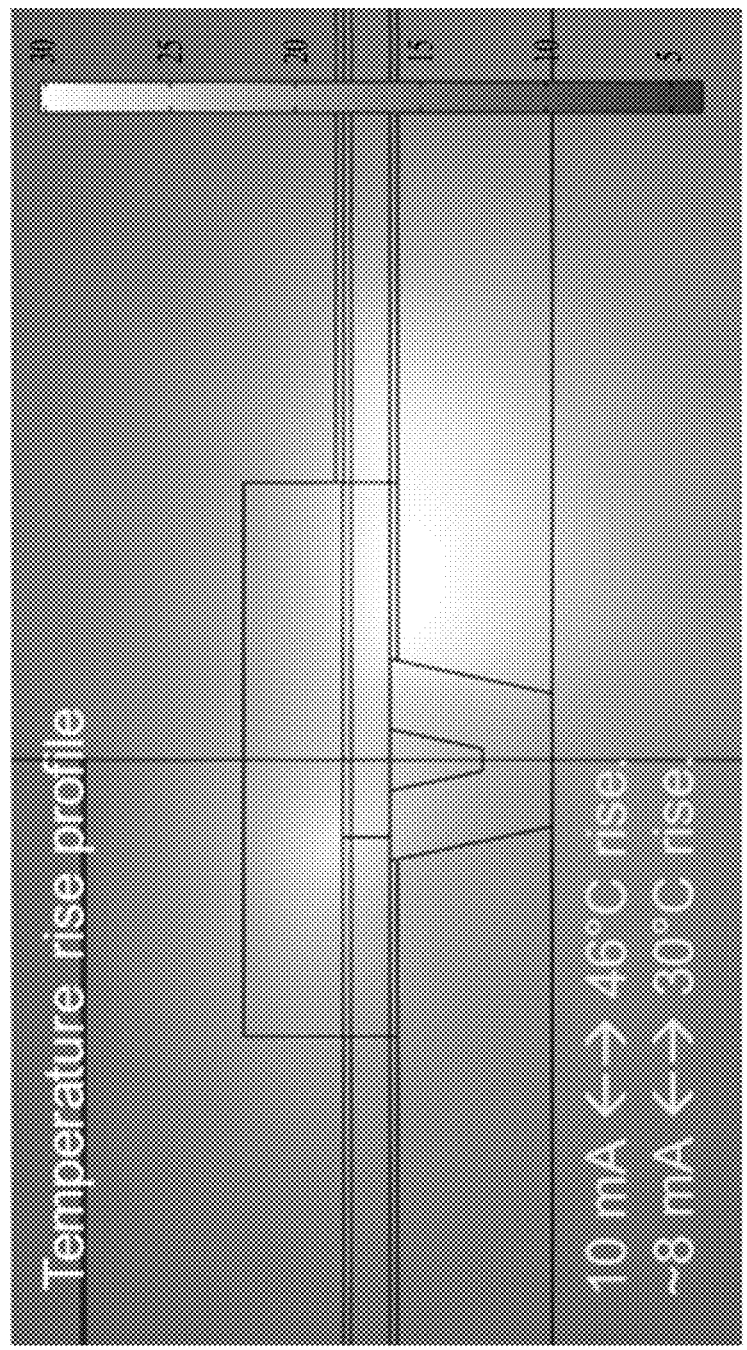
FIG. 4 illustrates a temperature rise profile on the ABS view of the SOT write head for SOT material height same as the SS height according to an embodiment.

FIG. 4 is an illustration 400 of an temperature rise profile on the ABS view of the SOT write head for SOT material height same as the SS height (~500 nm).

Dynamic Performance of the SOT Write Head:

The bias current in the SOT material described above can generate a net spin polarization due to the spin Hall effect, topological effect, or Rashba interaction in the SOT material (depending on the choice of SOT materials system). The current-induced spin polarization is accumulated at both interfaces of the SOT material, as shown in FIG. 5.

Figure 5A:
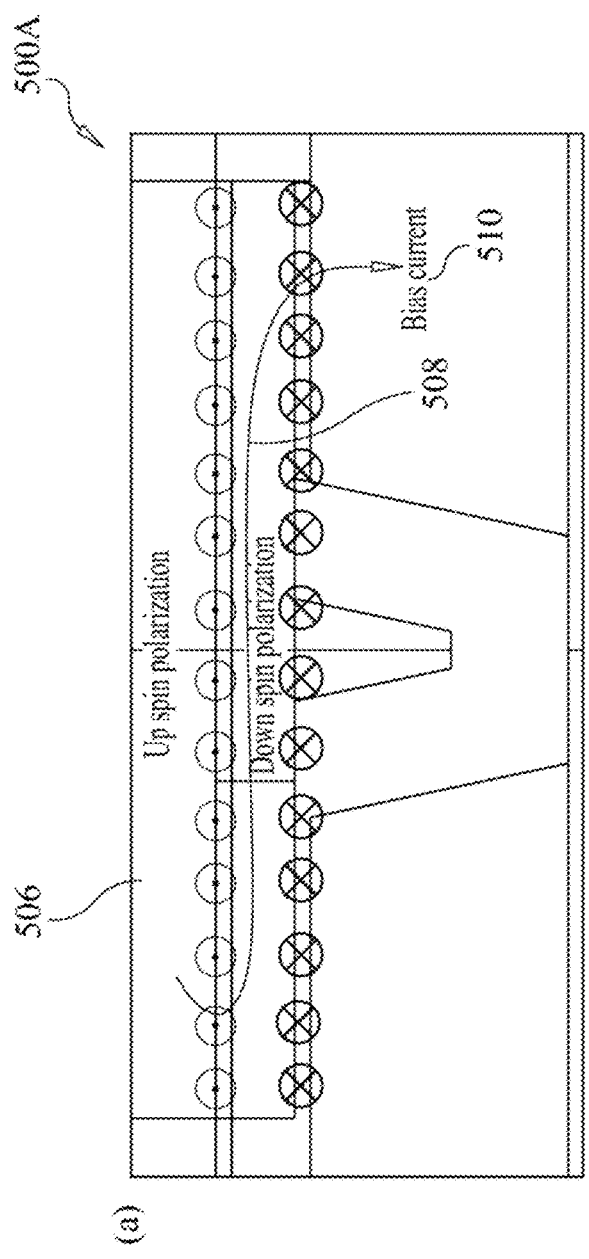
FIGS. 5A-D illustrate views of a spin polarization generated by SOT in the SOT write head according to an embodiment.
Figure 5B:
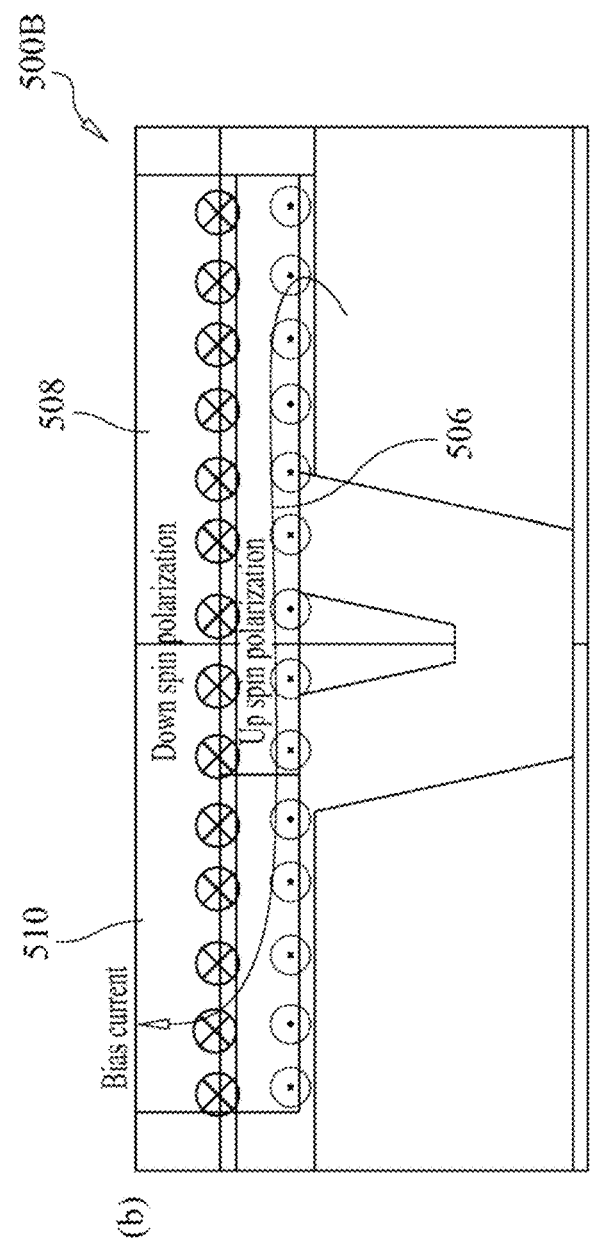
Figure 5C:
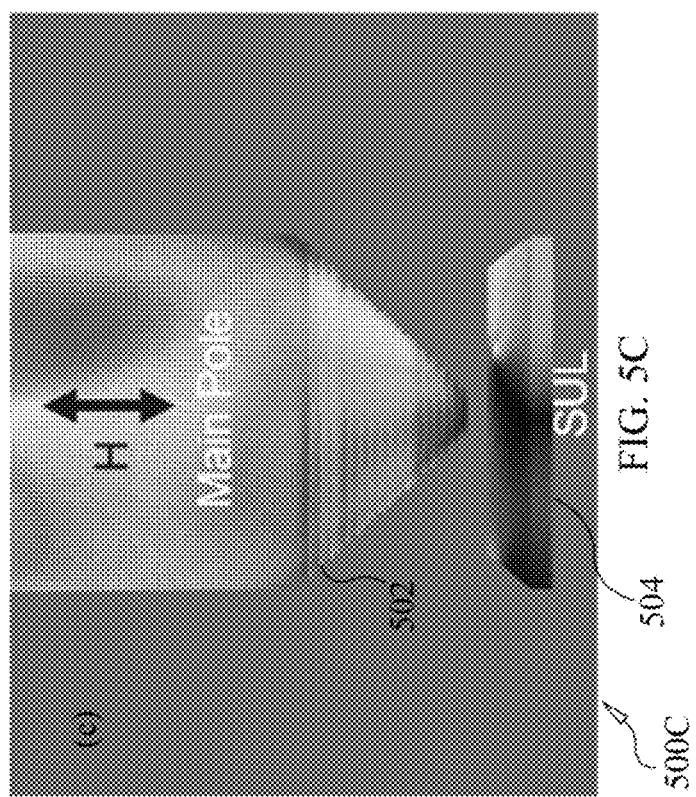
Figure 5D:
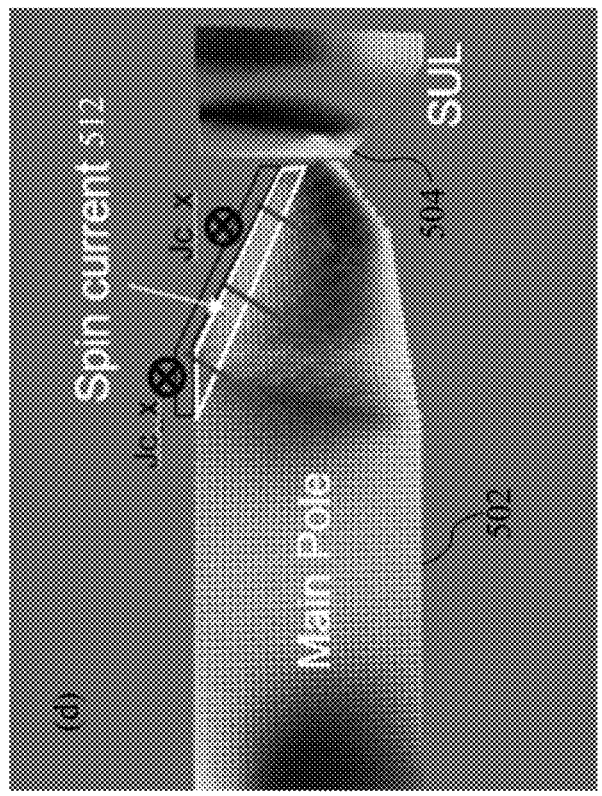

FIGS. 5A-D illustrate views 500A-D of a spin polarization generated by SOT in the SOT write head. For instance, FIG. 5A illustrates a current flowing from WS to SS, which can generate up spin polarization on the top interface between the SOT material and the HS, given that the SOT material is a positive spin Hall angle material like Pt. Similarly, opposite types of spin polarization, the down spin polarization, is created on the bottom interface between the SOT material and the main pole or SS. FIG. 5B illustrates spin polarizations at the interfaces reverses if we reverse the bias current direction from SS to WS. FIG. 5C illustrates a schematic drawing of the micromagnetic setup: the main pole and soft underlayer and the driving magnetic field. FIG. 5D illustrates that the spin current generated from the heavy metal is pumped into the main pole. In any of FIGS. 5A-D, a main pole 502 can be disposed of adjacent to a SUL 504. Further, an up spin polarization 506 and a down spin polarization 508 can direct a bias current 510. The main pole 502 can further have a spin current 512.

The bias current flowing from WS to SS can generate a net up-spin polarization on the top interface between the SOT material and the HS and a net down-spin polarization on the bottom interface between the SOT material and the SS/main pole (see FIG. 5A) when the SOT material has a positive spin Hall angle like Pt. On the contrary, the spin polarizations at the interfaces can reverse when the bias current direction is reversed to flow from the SS to WS (see FIG. 5B).

The spin polarization at the interfaces can inject a spin current of the like polarization into the adjacent layers. Thus, if the SOT materials have a positive spin-Hall angle, a purely down spin-polarized current can be injected into the main pole when the bias current flows from WS to SS, and a purely up spin-polarized current can be injected into the main pole when the bias current flows from SS to WS. Since the main pole is a magnetic material, the injected spin-polarized current can apply a torque to its magnetization, known as the SOT, which will manipulate its magnetization dynamics. If the bias current is in phase with the write head magnetic coil current that generates a magnetic field to rotate the main pole magnetization for writing operations, the bias current-induced SOT can assist the main pole rotation and reduce the rise time. Moreover, the taller SOT material height is beneficial for efficient spin current injection into the main pole because the taller SOT material can cover a larger area of the main pole, and the main pole will absorb a larger amount of accumulated electron spins.

In some instances, a set of finite-difference modeling-based micromagnetic simulations on the SOT-write-head structure can be performed that solves a detailed Landauer-Lifshitz-Gilbert equation considering details of magnetic configuration in the three-dimensional structures. The simulation can include a main pole similar to POR structures and a soft underlayer (SUL), as shown in FIGS. 5C-5D. An external AC magnetic field can drive the main pole from the coil operating at 1 GHz, which can be in phase with the bias current in the Pt WG (highlighted with a black box in FIG. 6). The bias current in Pt can generate a spin current with polarization collinear to the main pole magnetization and pump it into the main pole to apply SOT. In some instances, the spin polarization is orthogonal to charge current and spin current flow directions.

The SOT applied to the main pole can have two components: a field-like torque and a damping-like torque. In many SOT systems, the damping-like torque component is much higher than the field-like component. The damping-like torque can enhance the apparent damping of the system, and the main pole magnetization rotates faster. The choice of the SOT material and electrical connection can be such that the bias-current-induced spin polarization in the SOT material is in the same direction as the magnetic field from the drive coil.

In addition to the magnetic field from the drive coil, the bias-current for SOT assist can also generate an Oersted field. In metals like platinum (Pt) having a positive spin Hall angle, the bias-current-induced spin polarization has the same chirality as the bias-current-generated Oersted field. On the contrary, tantalum (Ta) or tungsten (W) having a negative spin Hall angle can exhibit a current-induced spin polarization with an opposite chirality compared to the same current-generated Oersted field. Thus, a SOT material with a positive spin Hall angle can provide an assisting effect from both SOT and the bias current induced Oersted field. However, a SOT material with a negative spin Hall angle can provide an assisting effect from SOT while it can be diminished by a certain factor by the de-assist from the bias current induced Oersted field. A positive spin Hall angle SOT material can be desired, and Pt can be a good candidate material.

The waveform of the SOT bias-current can be synchronized with the external field for optimized performance. In the simulations, the external magnetic field and the bias current have the same waveform with an artificial phase difference to study the effect of unwanted phase difference on the head performance. We look at the main pole rise time, defined as the time required to transition between 80% of the initial state to the 80% of the final state. The main pole rise time is around 232 ps for the POR geometry when the main pole is driven by the coil field only, and the SOT bias-current is turned off. The main pole rise time substantially reduces when we turn on the bias-current to have SOT assist. The main pole rise time under the SOT assist is around 205.4 ps (~11.5% improvement) and 197.7 ps (~15% improvement) when the bias-current density is around $5 \times 10^8$ A/cm$^2$ and $1 \times 10^9$ A/cm$^2$, respectively, provided that the SOT bias-current and the coil current are in phase. In addition to the rise time improvements, the total main pole magnetization is enhanced by up to 1.5%, which is expected to enhance the effective writability of the PMR head.

Figure 6:
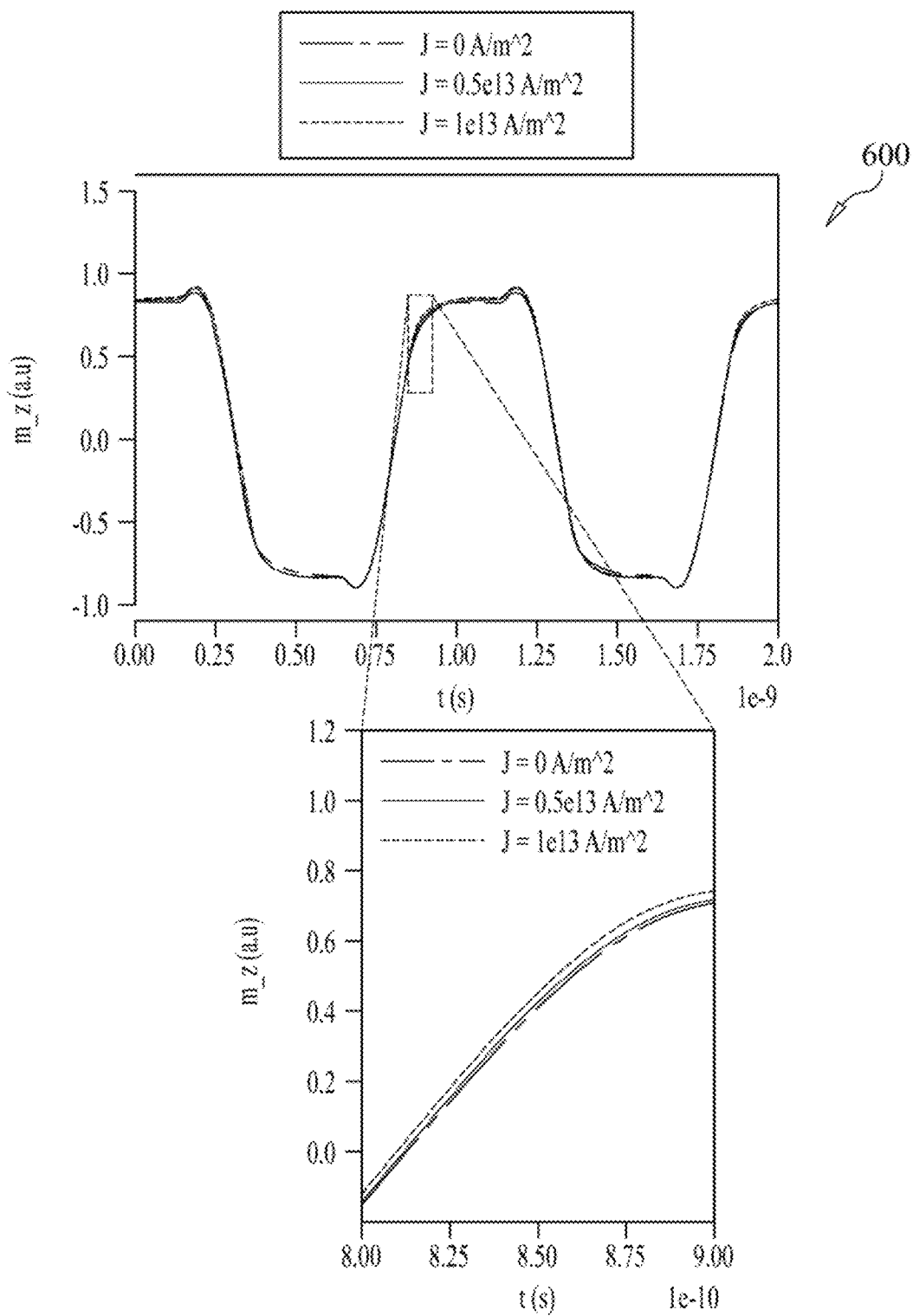
FIG. 6 illustrates example main pole magnetization dynamics in SOT write head with and without SOT assist according to an embodiment.

FIG. 6 illustrates example main pole magnetization dynamics in SOT write head with and without SOT assist 600.

Figure 7B:
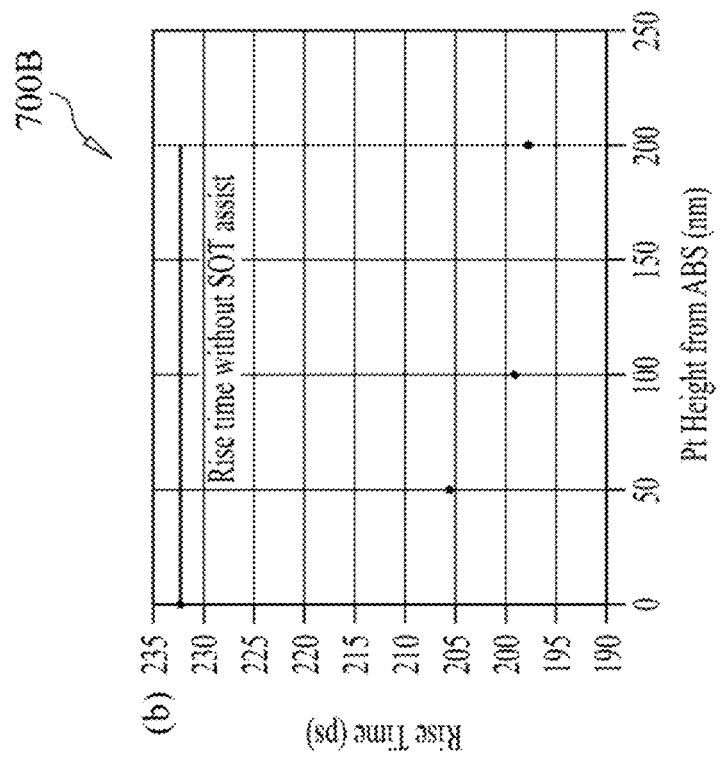
FIGS. 7A-7B illustrate example illustrations of a main pole rise time as a function of delay between bias current and coil current and Pt height from the ABS according to an embodiment.
Figure 7A:
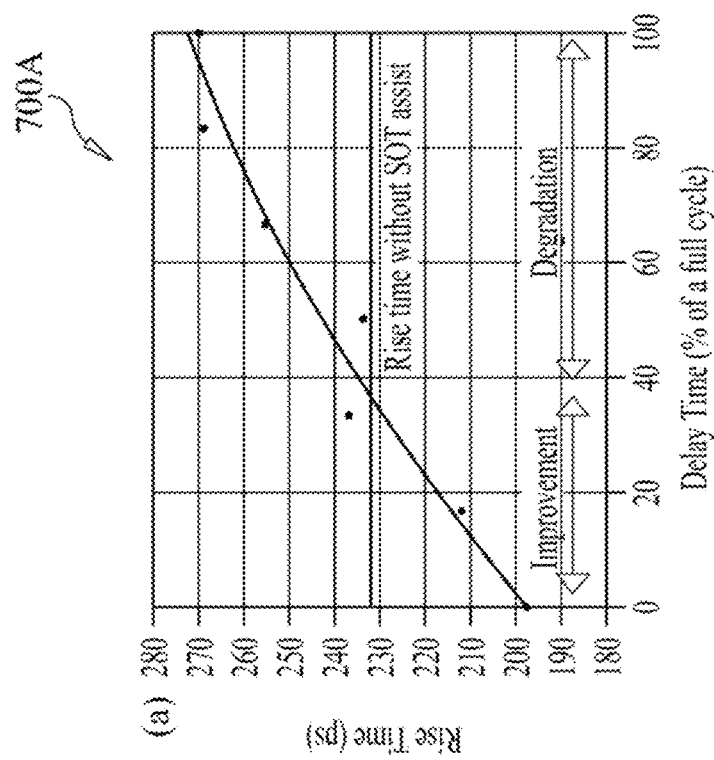

In principle, there may be a phase difference or time delay between the SOT bias current and the coil current (i.e., coil magnetic field) due to the difference in the path impedances, which may vary from design to design. The effect of such delay on the SOT write head performance using micromagnetic simulations can be studied, as shown in FIG. 7A. FIGS. 7A-7B illustrate example illustrations 700A, 700B of a main pole rise time as a function of (in FIG. 7A) delay between bias current and coil current and (in FIG. 7B) Pt height from the ABS.

The main pole rise time can gradually increase as can increase the delay between the SOT bias current and the coil current, as shown in FIG. 7A, and eventually exceeds the baseline rise time of the write head in the absence of the SOT-assist (~232 ps). Our micromagnetic simulation for the POR structure shows that SOT assists using Pt can tolerate a delay value of up to ~30% of the full cycle and provide improvements. A higher delay can cause performance degradation; see FIG. 7A.

The Pt height (see FIG. 3) can be an important design parameter in determining the device resistance and maximum allowable current, described above. A taller Pt can be preferable in the context of lowering the device resistance and allowing maximum bias current for SOT assist. A taller Pt can also cover a larger area of the main pole and inject more spin-polarized electrons to achieve an enhanced SOT assist. FIG. 7B can show that the main pole rise time decreases with Pt wire height at a fixed current density. In summary, a taller Pt wire in the WG may not only allow more bias current without sacrificing the reliability considerations but also effectively enhance the magnetic performance of the write head. In some cases, some design or process steps may warrant that the total Pt height is the same as the SS height (~500 nm in POR), which favors the device resistance consideration; however, only a part of that Pt wire is in direct contact with the main pole tip (e.g., up to 300 nm from ABS) which determines the effective spin injection area on the main pole. FIG. 7B can show that such a scenario is still sufficient to improve rise time substantially.

The effective contact area between the main pole and the Pt wire can vary due to various process-related reasons. Next, the effect of such variation on dynamic performance can be studied. The Pt stripe height can be kept fixed to 200 nm and reduce the effective contact area with the main pole in the horizontal direction. When there is a 100% connection between the main pole and the Pt wire, the rise time can be 197 ps (15% lower than POR. However, the rise time improvements may not change noticeably when the contact area is reduced up to 32% for the fixed Pt height, as shown in FIG. 8.

Figure 8:
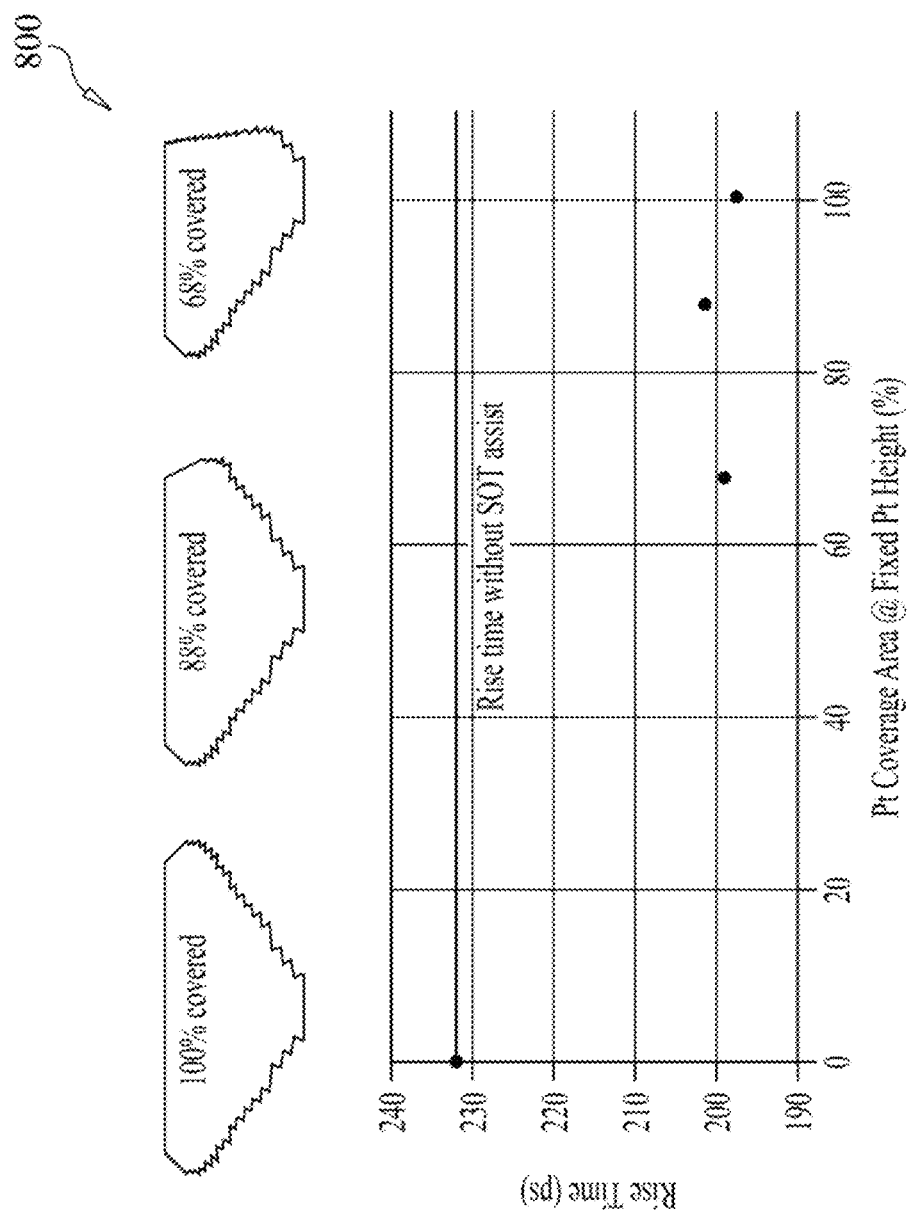
FIG. 8 illustrates an example illustration of the effect of contact area of main pole with the Pt wire on the rise time according to an embodiment.

FIG. 8 illustrates an example illustration 800 of the effect of contact area of main pole with the Pt wire on the rise time. Thus, the performance of the SOT assist may not be impacted by any process-dependent reduction in the direct contact area for spin injection.

Materials Considerations

The baseline structure of the SOT write head can be similar to the POR write head structures and uses the same material. The main pole and the hot seed of the write head can typically be made of magnetic materials with high saturation magnetization, typically in the order of 24 kG. The PP3 can be made of a magnetic material with high saturation magnetization close to 19 kG. The top yolk and the write shields can be made of 16 kG magnetic material and can include a high-magnetic-damping material in some designs. The side and leading shields can be made of 12 kG and 4 kG magnetic materials, respectively.

The SG and LG can be filled with a non-magnetic oxide-based insulator, including but not limited to $Al_2O_3$. The WG material can be a conductor material that exhibits high spin-orbit torque. There are many different classes of materials that exhibit a large spin-orbit torque, which includes, but is not limited to heavy metals like Pt, Ta, W, Ir, etc., or alloys like CuBi, CuIr, CuPt, Ag/Bi, etc. The materials can also include a topological insulator material like $Bi_2Se_3$, $Bi_2Te_3$, $(BiSb)_2Te_3$, $Bi_2Te_2Se$, $BiSbTeSe_2$, SnTe, etc., a topological semimetal material like $WTe_2$, $Cd_3As_2$, $WSe_2$, $PtTe_2$, etc., silicide materials like FeSi, some antiferromagnetic materials like IrMn, a semiconductor material like InAs, CoGa, GaAs, etc., and/or oxide materials like $SrIrO_3$, $Sr_2Ir_2O_4$, $SrRuO_3$, $IrO_2$, LAO/STO, etc.

SOT Circuits

As described in the previous sections, the bias current in the SOT material can change the polarity with the coil current. However, the write coil resistance (typically <5Ω) can be smaller than that of the SOT bias current path. Thus, a design can be adopted that ensures the synchronization of the two currents as well as maintains the required current in both the coil and the SOT material.

FIG. 9A-9C illustrates example circuits 900A-C to drive both the write coil current and the SOT bias current synchronously. As shown in FIGS. 9A-9C, each circuit 900A-C can include any of a Iw 902, current source 904, 906A-B, SOT 908, and resistor 910.

One design is shown in FIG. 9A, where two individual current sources: Iw and I2, drive the coil and SOT, respectively. In this design, one can design the current amplitude and overshoot waveforms for each branch separately. This may require a separate electrical input pad for the SOT structure.

The coil and the SOT current path can also be designed to be in series, as shown in FIG. 9B. However, the coil current (typically 30-150 mA) can be much higher than the SOT bias current, and such a high current is not desired in the SOT element. To route only 8 mA in the SOT path, a resistor can be added parallel to the SOT structure of value between 0.5-4Ω depending on the current amplitude in the coil. In this way, the current output from the preamp can be a single current source and is the same as Iw, but the preamp can sustain a higher output voltage to compensate for the added series elements.

The coil and the SOT structure can also be in parallel, as shown in FIG. 9C. However, as the coil resistance is much lower than that of the SOT structure, a resistance can be added in series with the SOT structure. The series resistance can be in the range of 9-712Ω, depending on the required coil current amplitude.

Both circuits in FIGS. 9B-9C can save two dedicated pads on the head slider and save one input circuit compared to the circuit in FIG. 9A.

In some instances, the present embodiments can relate to a magnetic write head structure that utilizes the current-induced spin-orbit torque (SOT) to enhance the rise time of main pole dynamics and the areal density capacity (ADC) gain in hard-disk-drive storage devices.

A non-dual-write-shield (nDWS)-based write head structure can be provided that includes a main pole (MP) that provides a strong and concentrated magnetic flux to write the medium bit. The structure can also include a trailing shield (TS) that collects back the magnetic flux and a write gap (WG) between the MP and the TS that is comprised of an electrical conductor made of a material exhibiting the physics of spin-orbit torque.

The structure can also include a side shield (SS), a leading shield (LS), and a write shield (WS) that prevents magnetic flux from reaching the medium bits away from the MP tip. The structure can also include a side gap (SG) between the MP and the SS on both sides of the MP tip, composed of non-magnetic electrical insulator materials, and a leading gap (LG) between the MP and the LS, composed of the same material and has the same dimension as the SG. The structure can also include a coil is wrapping around the MP through a PP3 shield that takes a time-dependent write current to saturate MP magnetization.

In some instances, the SOT material in the WG can extend along the length of WS as needed. From both ends of the SOT material, oxide layers on both sides electrically isolate WS from the SS (see FIG. 2).

In some instances, the SOT material is electrically isolated from the SS using a thin oxide layer on the left side of the main pole concerning the ABS view. This thin oxide starts from the left end of the SOT material and ends near the left edge of the main pole tip (see FIG. 2B). In some instances, the SOT material in claim 3 is electrically isolated from the WS using another thin oxide layer on the right side of the main pole concerning the ABS view. This second thin oxide starts from the right end of the SOT material and ends near the left edge of the main pole tip (see FIG. 2B).

In some instances, the configuration of the thin oxides can be interchanged, i.e., the thin oxide that isolates SOT material from the SS can start from the right end of the SOT material and end on the right edge of the main pole tip. Similarly, the thin oxide that isolates SOT material from the WS/HS can start from the left end of the SOT material and end on the right edge of the main pole tip.

In some instances, the electrical isolation configurations using oxides create a small opening in the SOT material near the main pole tip, through which a bias current will flow in the SOT material (see FIGS. 2B-2C).

In some instances, the Pt height in WG is important in determining the maximum allowable bias current and bias-current-induced SOT assist. A taller Pt height with the same height as the SS is desired to minimize the device resistance below 10Ω and enhance the maximum allowable bias current to 8 mA (see FIGS. 3-4).

In some instances, the taller Pt height also allows a larger contact area between the SOT material and the main pole, enhancing the spin current injection into the main pole and increasing the SOT-assist effect (see FIGS. 7A-B).

In some instances, the Pt height can be very tall up to the SS height to minimize the device resistance, but the direct contact height of Pt to the main pole can be shorter than the actual Pt height in some designs.

In some instances, for a tall Pt height, the rise time improvement in the main pole is less sensitive to the change in the total contact area between the Pt wire and the main pole in the horizontal direction.

In some instances, the bias current is applied between the top and bottom contact on the WS and SS (or the SS and SS), which enters (or leaves) the SOT material from the WS and gets concentrated near the small opening near the main pole and finally leaves (or enters) the SOT material from the SS. Such a current path ensures that 95% of the bias current is concentrated in the SOT material, and only 5% is shunted by the main pole (see FIG. 2C).

In some instances, the contact on WS can be at any position on the WS, and depending on its position, the device resistance can vary by up to ~1Ω.

In some instances, the contact position on SS is highly sensitive in determining the device resistance. The contact on SS must be as close as possible to the main pole center to minimize the device resistance and enhance the maximum allowable bias current within reliability limits.

In some instances, the bias current flow direction can be synchronized to the coil current flow direction such that the bias current-induced spin polarization in SOT material is in the same direction as the coil-current-induced magnetic field.

In some instances, the synchronized bias-current-induced spin polarization can apply SOT to the main pole, which improves the main pole magnetization dynamics by reducing the effective rise time compared to the POR without SOT assist. A bias current in the order of $10^8$ to $10^9$ A/cm$^2$ can result in a rise time reduction by 15% (see FIG. 6).

In some instances, the bias current for the SOT assist and the coil current can be synchronized by driving them separately with two independent current sources. In this circuit design, one can adjust the current amplitude and overshoot waveforms for each branch separately. However, this would require a separate electrical input pad for the SOT structure (see FIG. 9A).

In some instances, the bias current for the SOT assist and the coil current can be synchronized by putting these elements in series. However, the required coil current (typically 30-150 mA) is much higher than the desired SOT bias current (~8 mA). To route ~8 mA in the SOT element, a resistor (0.5-4Ω) can be added parallel to the SOT structure. In this circuit, the preamp is the single current source for both the coil current and the SOT bias current (see FIG. 9B).

In some instances, the bias current for the SOT assist and the coil current in claims 15-16 can be synchronized by putting these elements in parallel. However, as the coil resistance (<5Ω) is much lower than the SOT structure, a resistor (9-71Ω) needs to be added in series with the SOT structure to match the desired currents (see FIG. 9C).

In some instances, the bias current in may have a delay from the coil current due to the path impedance variations in various designs. A certain amount of rise time improvement is observed if the delay is lower than 30% of the full cycle time (see FIG. 7A).

In a first example embodiment, a write head for a disk drive is provided. The write head can include a main pole (MP) configured to provide a magnetic flux to a recording medium, a trailing shield (TS), and a write gap (WG) between the MP and TS. The WG can include an electrical conducting material that is capable of inducing a current-induced spin-orbit torque (SOT).

The write head can also include a write shield (WS) configured to mitigate magnetic flux from reaching the MP. The WG comprising the material capable of inducing the SOT can extend along at least a portion of a length of the WS; and The write head can also include a coil wrapped around the MP through a PP3 shield to provide a current to saturate the magnetic flux at the MP.

In some instances, the WG comprising the material capable of inducing the SOT extends along the length of the WS. Each of a first end and a second end of the WG can include a dielectric oxide layer to electrically isolate the WS from a side shield (SS).

In some instances, the write head further comprises a first oxide layer disposed between the SS and the WG comprising the material capable of inducing the SOT. The first oxide layer can extend between a first side of the WG and a first side of the MP.

In some instances, the write head further comprises a second oxide layer disposed between the SS and the WG comprising the material capable of inducing the SOT and extending between a second side of the WG and a second side of the MP.

In some instances, an opening is formed in the WG in the material capable of inducing the SOT. A bias current can be configured to flow in the WG through the opening.

In some instances, a height of the WG is about the same as a height of the SS to minimize a resistance of the write head below 10 ohms and increase maximum bias current to 8 milliamps (mA). The height of the WG matching the height of the SS can increase a contact area between the material capable of inducing the SOT and the MP.

In some instances, the write head further comprises a first contact and a second contact disposed between the WS and SS. The bias current can be applied between the first contact and second contact for the bias current to enter the WG comprising the material capable of inducing the SOT and is concentrated near the opening to ensure that a percentage of the bias current is concentrated near the material capable of inducing the SOT.

In some instances, the first contact is disposed at any position along the WS, and wherein the second contact is disposed on the SS.

In some instances, a direction of the bias current is synchronized to a current flow direction of the coil such that a spin polarization in the material configured to induce the SOT is in the same direction as the current flow direction of the coil.

In some instances, the bias current direction is synchronized to the current flow direction by driving each of the bias current and the current flow separately with independent current sources.

In some instances, the bias current direction is synchronized to the current flow direction by configuring the material capable of inducing the SOT and the coil in series or parallel. A resistor can be disposed in the other of series or parallel to the WG comprising the material capable of inducing the SOT.

In another example embodiment, a device is provided. The device can include a main pole (MP), a trailing shield (TS), and a write gap (WG) between the MP and TS. The WG can comprise an electrical conducting material that is capable of inducing a current-induced spin-orbit torque (SOT).

The device can also include a write shield (WS), where the WG comprising the material capable of inducing the SOT extends along at least a portion of a length of the WS. The device can also include a side shield (SS), where each of a first end and a second end of the WG comprises a dielectric oxide layer to electrically isolate the WS from the SS. The device can also include a side gap (SG) between the MP and SS on one or more sides of the MP tip and a coil wrapped around the MP through a PP3 shield to provide a current flow to saturate the magnetic flux at the MP.

In some instances, the device can include a first oxide layer disposed between the SS and the WG comprising the material capable of inducing the SOT. The first oxide layer can extend between a first side of the WG and a first side of the MP.

In some instances, the device can include a second oxide layer disposed between the SS and the WG comprising the material capable of inducing the SOT and extending between a second side of the WG and a second side of the MP.

In some instances, an opening is formed in the WG in the material capable of inducing the SOT, wherein a bias current is configured to flow in the WG through the opening.

In some instances, the device can include a first contact and a second contact disposed between the WS and SS, where the bias current is applied between the first contact and second contact for the bias current to enter the WG comprising the material capable of inducing the SOT and is concentrated near the opening to ensure that a percentage of the bias current is concentrated near the material capable of inducing the SOT.

In some instances, a direction of the bias current is synchronized to a current flow direction of the coil such that a spin polarization in the material configured to induce the SOT is in the same direction as the current flow direction of the coil. The bias current direction can be synchronized to the current flow direction by driving each of the bias current and the current flow separately with independent current sources or by configuring the material capable of inducing the SOT and the coil in series or parallel with a resistor disposed in the other of series or parallel to the WG comprising the material capable of inducing the SOT.

In another example embodiment, a write head is provided. The write head can include a main pole (MP), a trailing shield (TS), and a write gap (WG) between the MP and TS. The WG can include an electrical conducting material that is capable of inducing a current-induced spin-orbit torque (SOT). Further, an opening can be formed in the WG in the material capable of inducing the SOT. A bias current can be configured to flow in the WG through the opening. The write head can also include a write shield (WS) configured to mitigate magnetic flux from reaching the MP. The WG comprising the material capable of inducing the SOT can extend along at least a portion of a length of the WS. The write head can also include a coil wrapped around the MP through a PP3 shield to provide a current to saturate the magnetic flux at the MP.

In some instances, the material capable of inducing the SOT comprises any of platinum, tantalum, tungsten, iridium, copper-iridium alloy, copper-bismuth ally, and an iridium-manganese alloy.

In some instances, a direction of the bias current is synchronized to a current flow direction of the coil such that a spin polarization in the material configured to induce the SOT is in the same direction as the current flow direction of the coil. The bias current direction can be synchronized to the current flow direction by driving each of the bias current and the current flow separately with independent current sources or by configuring the material capable of inducing the SOT and the coil in series or parallel with a resistor disposed in the other of series or parallel to the WG comprising the material capable of inducing the SOT.

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A write head for a disk drive, the write head comprising:
   a main pole (MP) configured to provide a magnetic flux to a recording medium;
   a write gap (WG) disposed adjacent to the MP, wherein the WG comprises an electrical conducting material that is capable of inducing a current-induced spin-orbit torque (SOT), wherein an opening is formed in the electrical conducting material capable of inducing the SOT; and
   a write shield (WS) configured to mitigate stray magnetic flux from reaching magnetic media bits, wherein the WG comprising the material capable of inducing the SOT extends along at least a portion of a length of the WS.

2. The write head of claim 1, wherein the WG comprising the material capable of inducing the SOT extends along the length of the WS, and wherein each of a first end and a second end of the WG comprises a dielectric oxide layer to electrically isolate the WS from a side shield (SS).

3. The write head of claim 2, further comprising:
   a first oxide layer disposed between the SS and the WG comprising the material capable of inducing the SOT, wherein the first oxide layer extends between a first side of the WG and a first side of the MP.

4. The write head of claim 2, further comprising:
   a second oxide layer disposed between the SS and the WG comprising the material capable of inducing the SOT and extending between a second side of the WG and a first side of the MP.

5. The write head of claim 2, wherein a height of the WG is equal to a height of the SS to minimize a resistance of the write head below 10 ohms and increase maximum bias current to 8 milliamps (mA), and wherein the height of the WG matching the height of the SS increases a contact area between the material capable of inducing the SOT and the MP.

6. The write head of claim 1, wherein a bias current is configured to flow in the WG through the opening.

7. The write head of claim 6, further comprising:
   a first contact disposed on the WS, wherein the bias current is applied to at least the first contact for the bias current to enter the WG comprising the material capable of inducing the SOT and is concentrated near the opening to ensure that a percentage of the bias current is concentrated near the material capable of inducing the SOT.

8. The write head of claim 6, wherein a direction of the bias current is synchronized to a direction of a current flow in a coil by driving each of the bias current and the current flow separately with independent current sources.

9. The write head of claim 6, wherein a direction of the bias current is synchronized to a direction of a current flow by configuring the material capable of inducing the SOT and a coil in series or parallel, wherein a resistor is disposed in the other of series or parallel to the WG comprising the material capable of inducing the SOT.

10. A device comprising:
    a main pole (MP);
    a write gap (WG) disposed adjacent to the MP, wherein the WG comprises an electrical conducting material that is capable of inducing a current-induced spin-orbit torque (SOT), wherein an opening is formed in the WG in the electrical conducting material capable of inducing the SOT;
    a write shield (WS), wherein the WG comprising the material capable of inducing the SOT extends along at least a portion of a length of the WS;
    a side shield (SS), wherein each of a first end and a second end of the WG comprises a dielectric oxide layer to electrically isolate the WS from the SS; and
    a side gap (SG) between the MP and SS on one or more sides of the MP.

11. The device of claim 10, further comprising:
a first oxide layer disposed between the SS and the WG comprising the material capable of inducing the SOT, wherein the first oxide layer extends between a first side of the WG and a first side of the MP.

12. The device of claim 10, further comprising:
a second oxide layer disposed between the SS and the WG comprising the material capable of inducing the SOT and extending between a second side of the WG and a first side of the MP.

13. The device of claim 10, wherein a bias current is configured to flow in the WG through the opening.

14. The device of claim 13, further comprising:
a first contact disposed on the WS, wherein the bias current is applied to at least the first contact for the bias current to enter the WG comprising the material capable of inducing the SOT and is concentrated near the opening to ensure that a percentage of the bias current is concentrated near the material capable of inducing the SOT.

15. The device of claim 13, wherein a direction of the bias current is synchronized to a direction of a current flow in a coil by driving each of the bias current and the current flow separately with independent current sources or by configuring the material capable of inducing the SOT and the coil in series or parallel with a resistor disposed in the other of series or parallel to the WG comprising the material capable of inducing the SOT.

16. A write head comprising:
a main pole (MP);
a write gap (WG) disposed adjacent to the MP, wherein the WG comprises an electrical conducting material that is capable of inducing a current-induced spin-orbit torque (SOT), wherein an opening is formed in the WG in the material capable of inducing the SOT, wherein a bias current is configured to flow in the WG through the opening; and
a write shield (WS) configured to mitigate magnetic flux from reaching the MP, wherein the WG comprising the material capable of inducing the SOT extends along at least a portion of a length of the WS.

17. The write head of claim 16, wherein the material capable of inducing the SOT comprises any of platinum, tantalum, tungsten, iridium, copper-iridium alloy, copper-bismuth alloy, or an iridium-manganese alloy.

18. The write head of claim 16, wherein a direction of the bias current is synchronized to the a direction of a current flow in a coil by driving each of the bias current and the current flow separately with independent current sources or by configuring the material capable of inducing the SOT and the coil in series or parallel with a resistor disposed in the other of series or parallel to the WG comprising the material capable of inducing the SOT.

* * * * *